United States Patent [19]

Vanderwerf

[11] 4,436,392

[45] Mar. 13, 1984

[54] DISTORTION CORRECTION FOR AN OVERHEAD PROJECTOR SYSTEM

[75] Inventor: Dennis F. Vanderwerf, Cottage Grove, Minn.

[73] Assignee: Minnesota Mining and Manufacturing Company, St. Paul, Minn.

[21] Appl. No.: 455,424

[22] Filed: Jan. 3, 1983

[51] Int. Cl.$^3$ .............................................. G03B 21/14
[52] U.S. Cl. .............................. 353/38; 353/DIG. 3; 353/102; 353/70
[58] Field of Search ...................... 353/70, 69, 38, 98, 353/DIG. 3, DIG. 4, 22, 102, 23, 24, 99; 350/167, 421, 571, 452

[56] References Cited

U.S. PATENT DOCUMENTS

| | | | |
|---|---|---|---|
| 3,064,523 | 11/1962 | Meltzer | 353/70 |
| 3,511,563 | 5/1970 | Erwin | 353/38 |
| 3,637,308 | 1/1972 | Van Raalte et al. | 350/421 X |
| 4,002,408 | 1/1977 | Amma | 353/70 |
| 4,089,599 | 5/1978 | Kuboshima | 353/70 |
| 4,118,114 | 10/1978 | Anderson et al. | 353/38 |
| 4,204,881 | 5/1980 | McGrew | 350/452 X |

Primary Examiner—Harry N. Haroian
Attorney, Agent, or Firm—Donald M. Sell; James A. Smith; David W. Anderson

[57] ABSTRACT

An overhead projector which projects a distortion-free image onto a vertical screen at an oblique angle above the horizontal plane. In a first embodiment of the invention, a projection lens and mirror are displaced from the center of a transparency stage in the direction of projection and a thin, linear, incrementally-grooved prismatic sheet is positioned parallel to the stage and between the stage and a lighting means to redirect light transmitted through the stage and the transparency to the projection lens. In a second embodiment of the invention, the grooved prism is formed as an integral part of the lighting means.

6 Claims, 11 Drawing Figures

DISTORTION CORRECTION FOR AN OVERHEAD PROJECTOR SYSTEM

BACKGROUND OF THE INVENTION

1. Technical Field of the Invention

This invention relates to overhead projectors and, more specifically, to an improved system of overhead projection which forms an undistorted image on a vertical surface or screen.

2. Brief Description of the Prior Art

Conventional overhead projectors include a stage which supports the transparency to be projected, lighting means mounted below the stage to illuminate the transparency, and a projection lens and mirror combination suspended above the stage to direct the light image of the transparency onto a viewing screen. If the stage and projection lens are in parallel planes; the centers of the projection lens, the stage and the light source are on a common axis; and the mirror is oriented at a 45° angle to the plane of the stage, an undistorted image will be projected on a vertical screen. However, if these conditions are met, at least half of the projected image will be below the level of the mirror and, consequently, the audience's view of the image will be obstructed by the projector.

To provide the audience with an unobstructed view, the mirror is commonly tilted to an angle greater than 45° with respect to the horizontal, thereby raising the projected image above the level of the projector. If the viewing screen remains vertical, this projection of the image at an oblique angle results in a magnification distortion of the image into a trapezoidal shape in which the upper portion of the image is wider than the lower portion. Because of the shape of the projected image, this magnification distortion is commonly referred to as "keystoning".

A second type of distortion common to such projectors is a lack of uniform focus throughout the projected image. This type of distortion will occur unless the so-called Scheimpflug condition is met which requires that the plane of the screen and the planes of the virtual images of the projection lens and the stage be parallel or converge to a common point.

It is claimed that oblique projection of the image may be achieved without introducing either keystone distortion or focus non-uniformity distortion by tilting some of the elements which comprise the projector. U.S. Pat. No. 4,002,408 which issued to Amma on Jan. 11, 1977, for example, discloses two methods by which it is claimed that distortion-free oblique projection may be achieved. The first method involves moving the projection lens and mirror away from the center of the stage toward the screen and tilting the lighting means to project light at an angle through the transparency to the projection lens and mirror. The second method requires that the projection lens and the stage be tilted with respect to the mirror and the illuminating apparatus. Both methods introduce mechanical complexities to the projector and a tilted stage would pose difficulties for the presenter in positioning the transparency on the stage and writing on the transparency as it is being projected.

SUMMARY OF THE INVENTION

An overhead projector according to the present invention projects an undistorted image onto a vertical screen at an oblique angle above the horizontal plane by purely optical means, without any tilting of the components of the projector.

The foregoing is accomplished in a first embodiment of the invention by displacing a projection lens and mirror from the center of a transparency stage and the optic axis of a condensing lens of an overhead projector in the direction of projection and positioning a thin, linear, incrementally-grooved prismatic sheet parallel to the stage and preferably between the stage and the condensing lens. The grooves of the prismatic sheet are oriented perpendicular to the direction of displacement of the projection lens from the optic axis of the condensing lens and the sheet directs light to the projection lens at an angle which is equal to the oblique angle above the horizontal plane at which the image is projected.

In a second embodiment of the invention, the incrementally-grooved prism is formed as an integral part of the condensing lens.

DETAILED DESCRIPTION OF THE INVENTION

Appreciation of the fundamental principles of this invention is possible with a clear understanding of a conventional system of overhead projection. In a typical overhead projector 1, illustrated in FIGS. 1A and 1B of the accompanying drawings, a lamp 2 of suitable and conventional type is provided above a concave reflector 4, while a condensing lens 6, which may be an annular Fresnel lens or a combination of annular Fresnel lenses, is mounted above the lamp 2 so that light emitted by the lamp 2 and the reflector 4 is collected by the condensing lens 6 centered over the light source and is focused above the lens 6. All these elements constitute, in combination, lighting means generally indicated by the numeral 8.

Figure 1A:
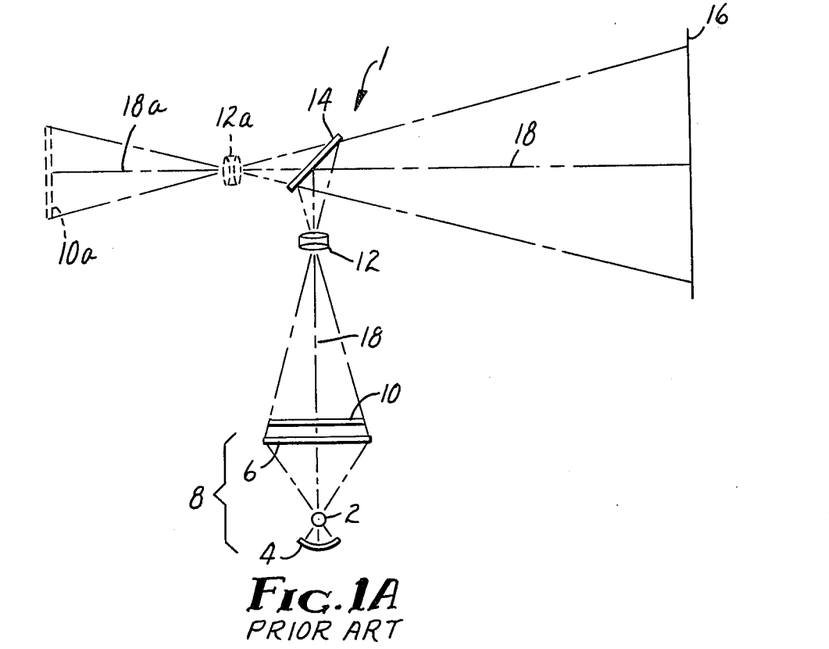
FIGS. 1A and 1B illustrate a prior art system of overhead projection by way of clarification of the principles of this invention; 1A being a schematic side view of the prior system and 1B being an elevational view of a screen and an image projected on the screen.
Figure 1B:
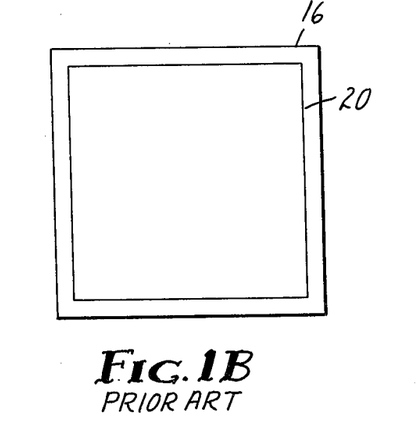

Mounted parallel to and above the condensing lens 6 is a transparent stage 10 upon which is placed a transparency or slide (not shown) to be imaged. The transparency or slide is hereinafter simply referred to as a "transparency" to mean any such picture or light-transmissive material adapted for projection in an overhead projector. A projection lens 12, often consisting of two positive lenses and a single negative lens, is mounted further above the stage 10 and along the optic axis of the condensing lens 6, and a mirror 14 is suitably mounted to intercept light from the projection lens 12 and project an image onto a vertical screen 16.

In the configuration shown in FIG. 1A, the mirror 14 is oriented at a 45° angle to the horizontal plane so the optic axis 18 of the projected image 20 is perpendicular to the stage 10 and the screen 16. This means that the plane of the virtual image of the stage 10a and the plane of the screen 16 are parallel. Since the planes of the virtual image of the stage 10a and the screen 16 are parallel, no magnification distortion of the image 20 will occur. Also, since the planes of the virtual images of the stage 10a and the projection lens 12a, and the plane of the screen 16, are parallel, uniform focus will be achieved throughout the image 20 because the Scheimpflug condition is met. The Scheimpflug condition requires that for the image 20 to be uniformly in focus, the planes of the virtual images of the stage 10a and the projection lens 12a and the plane of the screen 16 must be either parallel or converge to a common point.

Thus, to avoid distortion of the image 20, it is merely required that the optic axis 18 of the system be projected perpendicularly to the screen 16 by orienting the mirror 14 at a 45° angle to the horizontal plane. This configuration, however, is undesirable because at least a portion of the image 20 will be obscured because the overhead projector 1 is located between the screen 16 and the audience.

Figure 2A:
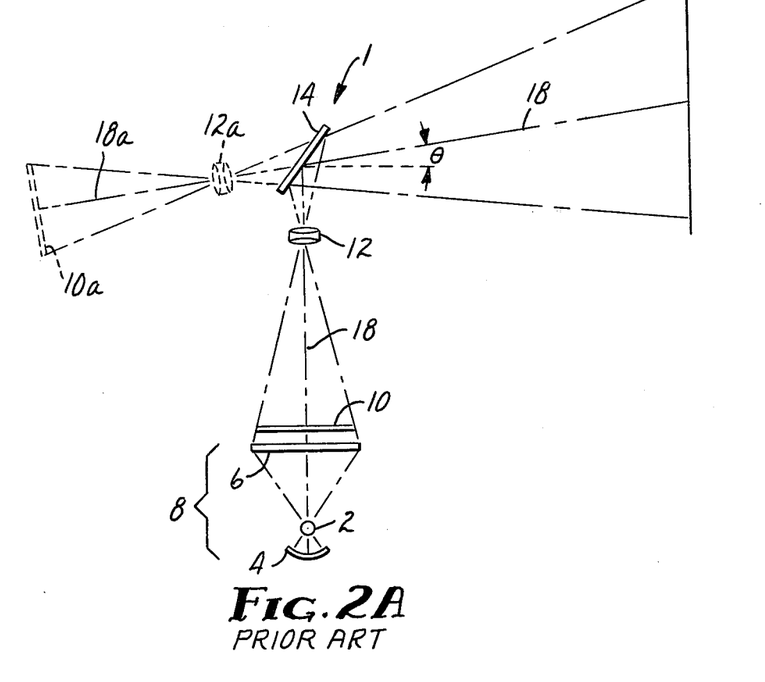
FIGS. 2A and 2B illustrate the effect of oblique projection on the image projected by the system of FIGS. 1A and 1B.

It is, therefore, desirable to raise the level of the image 20 above the level of the overhead projector 1 by tilting the mirror 14 to an angle greater than 45° to the horizontal plane, as shown in FIG. 2A, so that the optic axis 18 of the projected image 20 is projected from the mirror 14 to the screen 16 at an oblique angle "θ" above the horizontal plane. The result of increasing the angle of the mirror 14 is that while the optic axis 18 (and the reflected optic axis 18a) remains perpendicular to the plane of the stage 10 (and the plane of the virtual image of the stage 10a), the optic axis 18 is no longer perpendicular to the screen 16. As a consequence, the plane of the virtual image of the stage 10a and the plane of the screen 16 are no longer parallel.

Figure 2B:
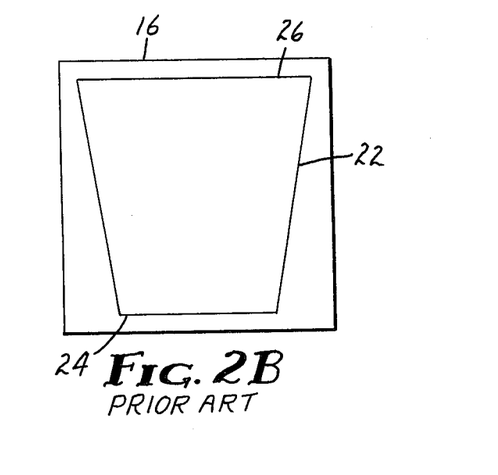

The result of this oblique projection is twofold. First, whenever the plane of the virtual image of the stage 10a and the plane of the screen 16 are not parallel, a magnification distortion is introduced to the projected image 22, as indicated by FIG. 2B, in which the image 22 is increasingly magnified from the bottom 24 of the image 22 to the top 26 of the image 22 to produce a trapezoidal image 22, the shape of which results in this type of distortion being referred to as "keystoning". Second, since the planes of the virtual images of the stage 10a and the projection lens 12a and the plane of the screen 16 are neither parallel nor converge to a common point, the Scheimpflug condition is not satisfied and the image 22 will not be uniformly in focus.

Figure 3A:
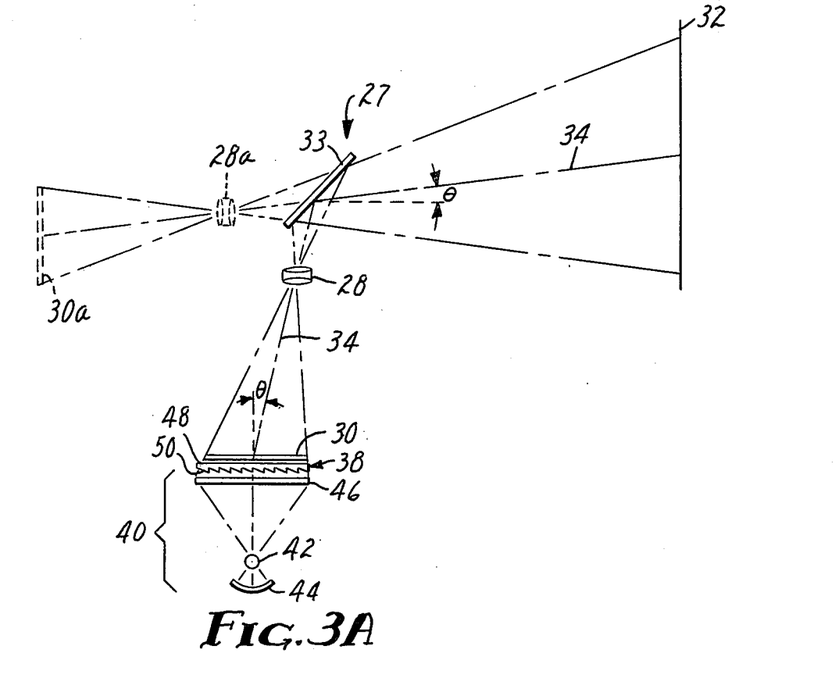
FIGS. 3A and 3B illustrate a projection system according to the present invention; 3A being a schematic side view of the projection system and 3B being an elevational view of a projection screen and an image projected on the screen.
Figure 3B:
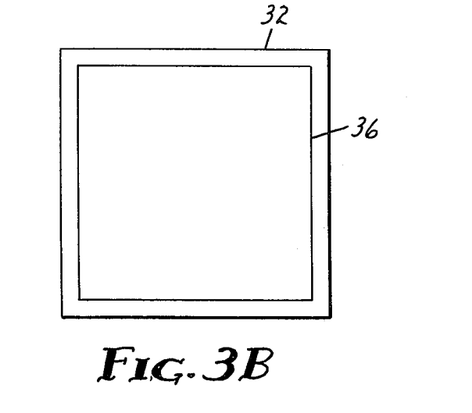

FIGS. 3A and 3B illustrate a projection system 27 and an image projected according to the present invention in which the image is projected at an oblique angle to the horizontal plane without producing either of the distortions discussed above, i.e., magnification distortion or focus non-uniformity.

It has been found that distortion will not be introduced if a projection lens 28 is offset from the center of a stage 30 and the optic axis of the condensing lens of the lighting means toward a projection screen 32, i.e., in the direction of projection, and the associated mirror 33 is oriented at 45° to a horizontal plane so that the optic axis 34 extends from the stage 30 to the projection lens 28 at an angle "θ" equal to the oblique projection agle of the image above the horizontal plane. Magnification distortion or "keystoning" is not introduced because, as shown in FIG. 3A, the plane of the virtual image of the stage 30a is parallel to the plane of the screen 32. Focus uniformity is maintained throughout the image 36 because the projection lens 28 is translated and not rotated with respect to the stage 30. Thus, the Scheimpflug condition is satisfied because the plane of the virtual images of the projection lens 28a is parallel to the plane of the virtual image of the stage 30a and the plane of the screen 32.

The foregoing inclination of the optic axis 34 is accomplished by positioning a thin sheet 38 having on one surface a series of parallel prisms forming a linear Fresnel prism. The sheet 38 is positioned parallel to the stage 30 between the stage 30 and a lighting means 40 which is comprised of a lamp 42, a concave reflector 44, and a Fresnel condensing lens 46 which are identical to the corresponding elements which comprise the lighting means 8 of FIG. 1A. As in FIGS. 1A and 2A, the lighting means 40 remains centered with respect to the stage 30 and is neither inclined nor rotated with respect to the stage 30.

Figure 4:
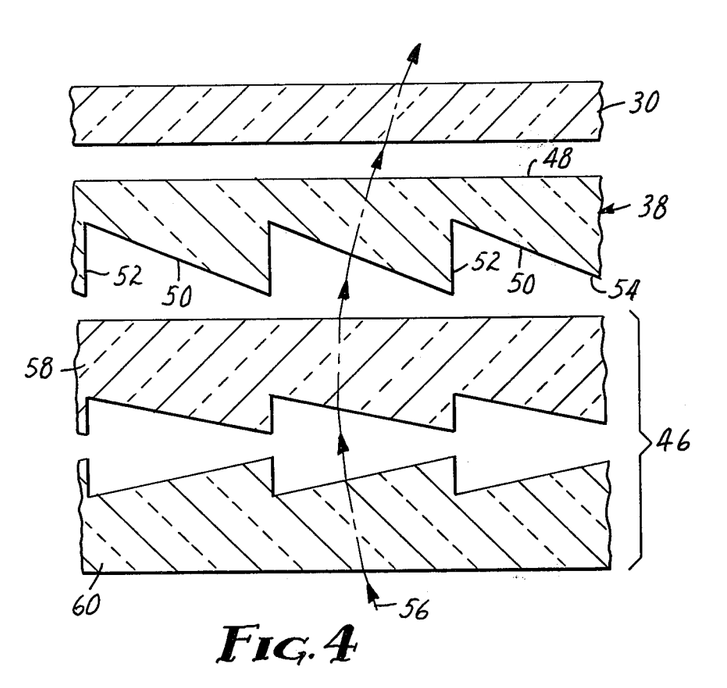
FIG. 4 is an enlarged cross-sectional side view of the prismatic structure of the present invention positioned between a stage and a condensing lens system of FIG. 3A also illustrating the path of a light ray through the system.

The prismatic sheet 38 is shown in greater detail in FIG. 4 and is formed by conventional Fresnel lens manufacturing techniques, preferably of a clear acrylic plastic, although the sheet 38 may be manufactured from glass or another plastic. The sheet 38 includes a planar side 48 adjacent the stage 30 and a grooved side 50 adjacent the condensing lens 46. The grooved side 50 of the sheet 38 is comprised of a series of risers 52, which may be perpendicular to the planar surface 48 of the sheet 38, and inclined surfaces 54 which are formed at shallow acute angles with respect to the planar side 48 of between approximately 16° and 28° for oblique projection angles "θ" of between 11.0° and 14.5°. The angle of the inclined surfaces 54 depends upon the location of the particular inclined surface 54 along the sheet 38 and the angle "θ" at which light is to exit the planar side 48 of the sheet 38. Generally speaking, the inclined surfaces 54 assume a maximum angle near the center of the stage 30, with decreasing values toward either end of the stage 30. The grooves are oriented perpendicular to the direction of offset of the projection lens 28 from the center of the stage 30 toward the screen 32.

The reason the inclined surfaces 54 must asssume varying angles along the length of the sheet 38 is that the prismatic sheet 38 is required to redirect light exiting the condensing lens 46 which is being focused or condensed by the lens 46, as its name implies, and thus is convergent rather than collimated or parallel. If the light exiting the lens 46 were collimated, a prismatic sheet having grooves formed with parallel inclined surfaces would be sufficient to redirect light to the projection lens 28. But since the light exiting the condensing lens 46 is convergent and thus incident on the prismatic sheet 38 at different angles along the length of the sheet 38, the inclined surfaces 54 must assume their varying angles so that the light exiting the condensing lens 46 remains focused at the projection lens 28.

The angle of any particular inclined surface 54 of a prismatic sheet 38 designed for use at a predetermined oblique projection angle "$\theta$" may be determined by skew or three dimensional ray trace analysis as is well known in the art.

FIG. 4 illustrates a portion of the condensing lens 46, the prismatic sheet 38 and the stage 30 at a position along the center line of the stage 30 and offset from the center of the stage 30 in a direction opposite the direction of projection. FIG. 4 also schematically details the path of a light ray 56 through the condensing lens 46, the prismatic sheet 38, and the stage 30. The condensing lens 46 is actually comprised of two annular Fresnel lenses 58 and 60 which gather light emitted by the lamp 42 and redirect this light through the stage 30 to the projection lens 28. The salient point to be observed in FIG. 4 is that the prismatic sheet 38 redirects light exiting the condensing lens 46 to the translated position of the projection lens 28 which is offset from the center of the stage 30 in the direction of projection.

Figure 5:
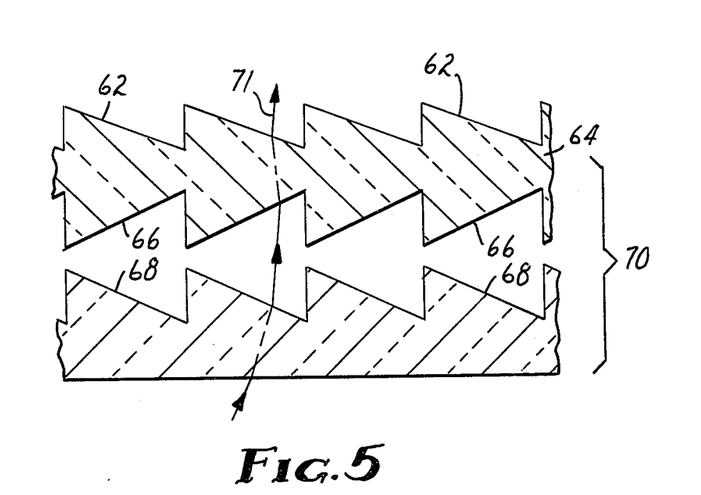
FIG. 5 is an enlarged cross-sectional side view of a second embodiment of the prismatic structure of the present invention incorporated in a condensing lens system according to the present invention.

FIG. 5 illustrates a second embodiment of the invention in which a linear Fresnel prism 62 is formed as the top surface of a dual-lens sheet 64 on which an annular Fresnel lens 66 is formed as the bottom surface. Below the dual-lens sheet 64 is a separate annular Fresnel lens 68. The two annular Fresnel lenses 66 and 68 constitute a condensing lens 70 which operates identically as the condensing lens 46 of FIG. 4.

FIG. 5 illustrates a portion of the condensing lens 70 and Fresnel prism 62 located along the center line of the stage 30 and offset from the center of the stage 30 in the direction of projection. Thus, FIGS. 4 and 5 illustrate portions of the lens systems located at opposite sides of the center of the stage 30. FIG. 5 illustrates that a light ray 71 exiting the Fresnel prism 62 forward of the center of stage 30 (toward the screen 32) is directed to a point offset from the center of the stage 30 in the direction of projection as is light exiting a point offset from the center of the stage 30 opposite the direction of projection (FIG. 4).

The advantages of combining the linear prism 62 and the annular Fresnel lens 66 into one dual-lens sheet 64 are that manufacturing costs are reduced and light transmission through the lens system is increased because the need for a separate prismatic sheet 38 as in FIG. 4 is eliminated and thus the number of surfaces through which light must pass are reduced.

The prismatic sheet 38 of FIG. 4 and the prism surface 62 of FIG. 5 direct the optic axis of light exiting the condensing lens 46 or the condensing lens 70, respectively, at an angle "$\theta$" to the vertical which is equal to the oblique angle above the horizontal plane at which it is desired to project the image. This is shown in FIG. 3A. The angle "$\theta$" is fixed for a particular prismatic sheet 38 or prism surface 62 and thus, for a particular prismatic sheet 38 or surface 62, the oblique angle at which the image may be projected without introducing distortion is also fixed. While the angle "$\theta$" is not adjustable for a given overhead projector 27, it should be recognized that the oblique angle at which the image can be projected without distortion can be selected by substituting a differently formed Fresnel prism sheet 38 or prism surface 62.

Figure 6:
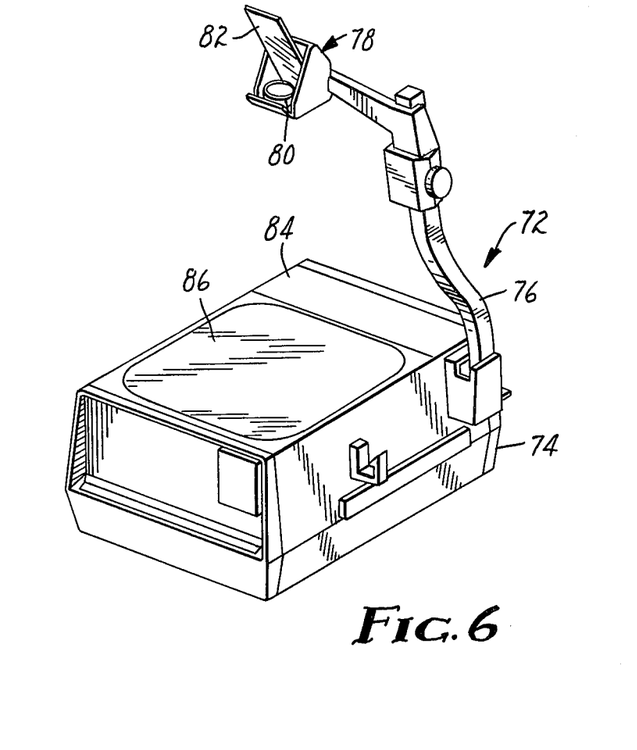
FIG. 6 is a perspective view of an overhead projector made according to the present invention.

FIG. 6 illustrates an overhead projector 72 which incorporates the principles of the invention. The projector 72 includes a housing 74 which contains the lighting means 40 and an upright arm 76 which supports a projection head 78 which contains a projection lens 80 and a mirror 82. The top surface 84 of the projector 72 includes a transparency stage 86 upon which a transparency may be placed and projected. Since the optic axis of the light leaving the stage 86 is inclined at an angle "$\theta$" with respect to the vertical (FIG. 3A), the upright arm 76 is inclined at an equal angle to ensure that the center of the projection lens 80 contained within the projection head 78 is always located along this optic axis. The arm 76 must be inclined because the projection head 78 may be moved toward or away from the stage 86 along the optic axis to vary the magnification of the projected image. Although the arm 76 is inclined, the projection lens 80 always remains parallel to the stage 86.

Figure 7:
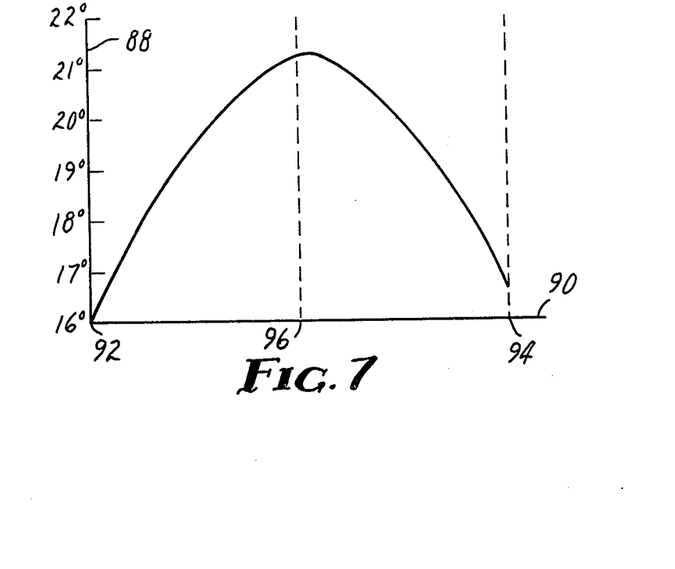
FIG. 7 is a graphic illustration of the prismatic structure of FIG. 4.

By way of example, FIG. 7 illustrates graphically the angles of the inclined surfaces 54 of the prism sheet 38 of FIG. 4 along the length of the sheet 38. In FIG. 7 the angle of the inclined surface 54 is plotted along the abscissa axis 88 with respect to an ordinate axis 90 which represents distance along the sheet 38 from a position 92 nearest the screen 32 to a position 94 farthest from the screen 32. For a value of "$\theta$" equal to 11.0°, FIG. 7 indicates that the angle of the inclined surfaces 54 increase from a minimum of approximately 16° to a maximum of approximately 21.3° at a position near the center of the stage 30. The location of the center of the stage is indicated by a dashed line 96 in FIG. 7.

The value of the angle of any inclined surface face 54 at any position along the prismatic sheet 38 of FIG. 4 may be calculated from the equation:

$$\tan \phi = \tan \phi_0 + 4dy^3 + 6ey^5 + 8fy^7 + 10gy^9 \quad (1)$$

where
$\phi$ = the angle of any inclined surface 54 at a distance y from the center of the stage 30;
$\phi_0$ = the angle of the inclined surface 54 at the center of the sheet 38;
d, e, f, g = constants;
y = distance from the center of the stage 30 toward or away from the screen 32.

Figure 8:
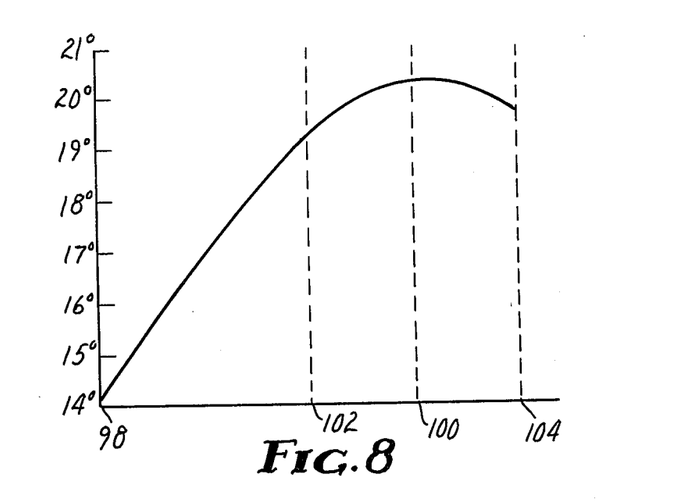
FIG. 8 is a graphic illustration of the prismatic structure of FIG. 5.

For an oblique projection angle of "$\theta$" of 11.0 degrees, the angles of the inclined surfaces 54 in the region from the stage center (where y=0) to the edge farthest from the screen 32 (point 94 in the graph of FIG. 7) may be calculated by substituting the following parameters in equation (1):
  $\tan \phi_0 = 0.385$
  $d = -0.411 \times 10^{-7}$ mm
  $e = 0.327 \times 10^{-11}$ mm
  $f = -0.135 \times 10^{-15}$ mm
  $g = 0.214 \times 10^{-20}$ mm
  y = distance from center of stage 30 in millimeters In the region from the stage center to the edge nearest the screen 32 (point 92 on the graph of FIG. 7), the angles of the inclined surfaces 54 may be calculated by substituting the following parameters in equation (1):
  $\tan \phi_0 = 0.385$
  $d = -0.315 \times 10^{-7}$ mm
  $e = 0.230 \times 10^{-11}$ mm
  $f = -0.922 \times 10^{-16}$ mm
  $g = 0.144 \times 10^{-20}$ mm
  y = distance from center of stage 30 in millimeters FIG. 8 illustrates the variation in angles of the inclined surfaces which comprise the Fresnel prism 62 of FIG. 5. Using the same coordinate system, and again referring to an angle "$\theta$" of 11.0°, FIG. 8 indicates that the angle of the inclined surfaces increases from a minimum of approximately 14.1° at a point 98 nearest the screen 32 to a maximum of approximately 20.3° at a point 100 located along the sheet 64 about midway between the center of the stage 30 (indicated by line 102) and a point 104 located farthest from the screen 32.

The value of the angle of any inclined surface at any position along the prismatic sheet 64 of FIG. 5 may also be calculated from equation (1) and for an oblique projection angle "$\theta$" of 11.0 degrees, the angles of the inclined surfaces in the region from the stage center to the edge farther from the screen 32 (point 104 on the graph of FIG. 8) may be calculated by substituting the following parameters in equation (1):

$\tan \phi_0 = 0.372$
$d = -0.867 \times 10^{-7}$ mm
$e = 0.856 \times 10^{-11}$ mm
$f = -0.382 \times 10^{-15}$ mm
$g = 0.627 \times 10^{-20}$ mm
$y$ = distance from center of stage 30 in millimeters In the region from the stage center to the edge nearest the screen 32 (point 98 on the graph of FIG. 8), the angles of the inclined surfaces may be calculated by substituting the following parameters in equation (1):

$\tan \phi_0 = 0.372$
$d = 0.543 \times 10^{-7}$ mm
$e = -0.631 \times 10^{-11}$ mm
$f = 0.291 \times 10^{-15}$ mm
$g = -0.484 \times 10^{-20}$ mm
$y$ = distance from center of stage 30 in millimeters It should be pointed out again that the angles of the inclined surfaces are not initially calculated by use of equation (1) but rather are determined by skew or three dimensional ray trace analysis and in such a manner may be determined for any oblique projection angle "$\theta$". Equation (1) and the parameters listed above merely describe a prismatic sheet having inclined surfaces, the angles of which have already been determined by such analysis.

FIGS. 7 and 8 illustrate that there is considerable difference in the profiles of the prisms 50 and 62 depending on whether the prism 50, 62 is formed immediately adjacent the stage 30 or on the surface of a sheet 38 opposite a planar surface 48 which is immediately adjacent the stage 30.

In this regard, it should be noted that the grooved side 50 of the sheet 38 could be formed adjacent the stage 30 rather than opposite a planar surface 48 as shown in FIG. 4. In other words, the sheet 38 of FIG. 4 could be inverted. In this case, the angles of the inclined surfaces 54 would more closely be illustrated by the representation of FIG. 8 than that of FIG. 7.

While the present invention has been described in connection with certain specific embodiments, it is to be understood that it is not to be limited to those embodiments. On the contrary, it is intended to cover all alternatives and modifications falling within the spirit and scope of the invention as set forth in the appended claims.

I claim:

1. An overhead projector for projecting an undistorted image of a transparency onto a vertical projection surface at an oblique angle above a horizontal plane, comprising:

a horizontal stage upon which the transparency to be imaged is placed;

a projection lens having a predetermined optic axis oriented in a vertical plane and positioned on one side of said stage and offset from the center of said stage toward said projection surface along a line extending from the center of said stage and inclined toward said projection surface at an angle with respect to a vertical plane equal to said oblique angle;

lighting means disposed opposite said projection lens with respect to said stage and including a light source having a predetermined optic axis oriented in a vertical plane for directing light toward said transparency and a condensing lens positioned between said light source and said stage and having a predetermined optic axis oriented in a vertical plane for directing light through said stage and said transparency and focusing said light at a focal position above the center of said stage so that light exiting said condensing lens is convergent at said focal position;

a Fresnel prism having a series of parallel, linear grooves oriented perpendicular to the direction of said offset of said projection lens, said grooves including inclined planar surfaces angled with respect to a horizontal plane at varying angles, said prism being disposed between said condensing lens of said lighting means and said stage for redirecting said convergent light focused by said condensing lens to a position along said line extending from the center of said stage and inclined toward said projection surface at an angle with respect to a vertical plane equal to said oblique angle, said position along said line corresponding to the position of said projection lens; and a planar mirror disposed opposite said stage with respect to said projection lens to reflect light transmitted by said projection lens to said projection surface.

2. An overhead projector according to claim 1 wherein said Fresnel prism comprises a thin, light-transmissive sheet disposed between said lighting means and said stage and which includes a planar surface parallel to said stage and an opposite surface comprised of said linear grooves.

3. An overhead projector according to claim 2 wherein said grooves are comprised of parallel spaced risers oriented substantially perpendicular to said Fresnel prism planar surface and connecting adjacent ones of said inclined planar surfaces.

4. An overhead projector according to claim 2 wherein said Fresnel prism planar surface is adjacent said stage.

5. An overhead projector according to claim 1 wherein said condensing lens is comprised of two opposed annular Fresnel lenses.

6. An overhead projector according to claim 5 wherein said linear Fresnel prism and the annular Fresnel lens nearer the stage are formed as opposite surfaces of a single sheet of light-transmissive material.

* * * * *